United States Patent
Fukuda et al.

(10) Patent No.: US 10,657,145 B2
(45) Date of Patent: May 19, 2020

(54) CLUSTERING FACETS ON A TWO-DIMENSIONAL FACET CUBE FOR TEXT MINING

(71) Applicant: INTERNATIONAL BUSINESS MACHINES CORPORATION, Armonk, NY (US)

(72) Inventors: Takashi Fukuda, Nerima-ku (JP); Hiroaki Kikuchi, Yokohama (JP); Shimpei Yotsukura, Saitama (JP)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 15/845,023

(22) Filed: Dec. 18, 2017

(65) Prior Publication Data

US 2019/0188304 A1    Jun. 20, 2019

(51) Int. Cl.
| | |
|---|---|
| *G06F 16/24* | (2019.01) |
| *G06F 16/2458* | (2019.01) |
| *G06F 9/50* | (2006.01) |
| *G06F 16/28* | (2019.01) |
| *G06K 9/62* | (2006.01) |
| *G06K 9/00* | (2006.01) |
| *G06F 3/0484* | (2013.01) |

(52) U.S. Cl.
CPC ........ *G06F 16/2465* (2019.01); *G06F 9/5083* (2013.01); *G06F 16/2471* (2019.01); *G06F 16/285* (2019.01); *G06K 9/6223* (2013.01); *G06K 9/6272* (2013.01); *G06F 3/04842* (2013.01); *G06K 9/00469* (2013.01)

(58) Field of Classification Search
CPC .................................................. G06F 16/285
USPC .......................................................... 707/730
See application file for complete search history.

(56) References Cited

U.S. PATENT DOCUMENTS

| | | | |
|---|---|---|---|
| 8,676,805 B1 | 3/2014 | Long et al. | |
| 9,558,259 B2 | 1/2017 | Gallivan | |
| 2013/0298050 A1 | 11/2013 | Emanuel et al. | |
| 2014/0282586 A1* | 9/2014 | Shear | G06F 9/5072 718/104 |
| 2017/0046422 A1 | 2/2017 | Tan et al. | |

FOREIGN PATENT DOCUMENTS

| | | |
|---|---|---|
| CN | 104239385 | 12/2014 |
| WO | 2019123113 A1 | 6/2019 |

OTHER PUBLICATIONS

PCT International Search Report & Written Opinion dated May 7, 2019 for PCT Application No. PCT/IB2018/059906.

* cited by examiner

*Primary Examiner* — Baoquoc N To
(74) *Attorney, Agent, or Firm* — Reza Sarbakhsh (57) ABSTRACT

A computer-implemented method and system for clustering facets on a two-dimensional facet cube for text mining. The method and system performs text mining based on facets to analyze unstructured data in one or more documents by generating a two-dimensional facet cube that is a correlation matrix for one or more facets associated with a set of one or more of the documents; grouping one or more of the facets in the correlation matrix into at least one cluster; calculating a center for the cluster; and identifying facets that are located near the calculated center of the cluster as being representative of the cluster.

18 Claims, 10 Drawing Sheets

CLUSTERING FACETS ON A TWO-DIMENSIONAL FACET CUBE FOR TEXT MINING

BACKGROUND

There are a number of ways to search. A navigational search uses a hierarchy structure or taxonomy to enable users to browse information. A direct search allows users to query information using one or more keywords. A faceted search often combines elements of both navigational and direct searches by allowing users to explore the information by applying multiple filters and/or keywords to a facet hierarchy.

The facet hierarchy classifies the information along dimensions, called facets. Facets correspond to properties of the information, and are often derived by analysis of text or documents using various extraction techniques or from metadata associated with the information. For example, online retailers often use a faceted hierarchy that reflects product attributes, such as type, brand, price, etc. Facet values can be added to the facet hierarchy manually or extracted automatically using text mining software.

An n-dimensional facet cube can be generated using the facets, wherein the facet cube allows multi-dimensional access to data. Each facet is a separate dimension of the facet cube, and the intersection of two or more dimensions can be computed and displayed, such as all products of a particular type, brand and price, sold in a given time period. This allows users to query for complex relationships in the facet values, and discover previously unknown relationships in the facet values.

However, there is a need in the art for improved techniques of deriving facet values.

SUMMARY

The invention provided herein has a number of embodiments useful, for example, in implementing a computer-implemented method and system for clustering facets on a two-dimensional facet cube for text mining.

The method and system performs text mining based on facets to analyze unstructured data in one or more documents. A two-dimensional facet cube is generated that is a correlation matrix for one or more facets associated with a set of one or more of the documents. One or more of the facets are grouped in the correlation matrix into at least one cluster. A center is calculated for the cluster. Facets that are located near the calculated center of the cluster are identified as being representative of the cluster.

The correlation matrix may comprise a self-correlation matrix. An intersection of a specified row and column of the correlation matrix has a correlation value for the facets represented by the specified row and column.

The grouping of the facets in the correlation matrix into the cluster further comprises: generating a correlation vector for a row or column of the correlation matrix; and grouping the facets in the correlation vector into the cluster.

The method and system may further comprise calculating a distance correlation for the facets in the cluster, and calculating a center of the cluster to identify at least one of the facets in the cluster that is nearest the center of the cluster based on the distance correlation.

The method and system may further comprise iteratively calculating facet statistics and refining the set based on the facet statistics, in order to determine the facets associated with the documents in the set.

Consequently, the present invention provides improved techniques for analyzing documents of unstructured text. Specifically, the present invention automatically derives facet values by text mining the documents. Dynamic clustering of the facet values is automatically performed using an n-dimensional facet cube that is a correlation matrix. The results include the discovery of relationships between the facet values, as well as the documents themselves.

DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

There is a growing need for improved techniques of analyzing unstructured data, such as text found in documents. Text mining based on facets is one of the more effective methods to analyze unstructured data.

In this context, a facet is a "tag" associated with a set of one or more documents. Specifically, the facet is associated with the documents that satisfy one or more specified conditions. Examples of the specified conditions may include: specified keywords appear in the document; the document was created in a specified date range; the document includes specified topics; etc.

The present invention derives facet values automatically by text mining of documents or other unstructured text, and then generating an n-dimensional facet cube for clustering the facets. This allows for the discovery of relationships between the facets, as well as the documents themselves.

Facet Processing

Figure 1:
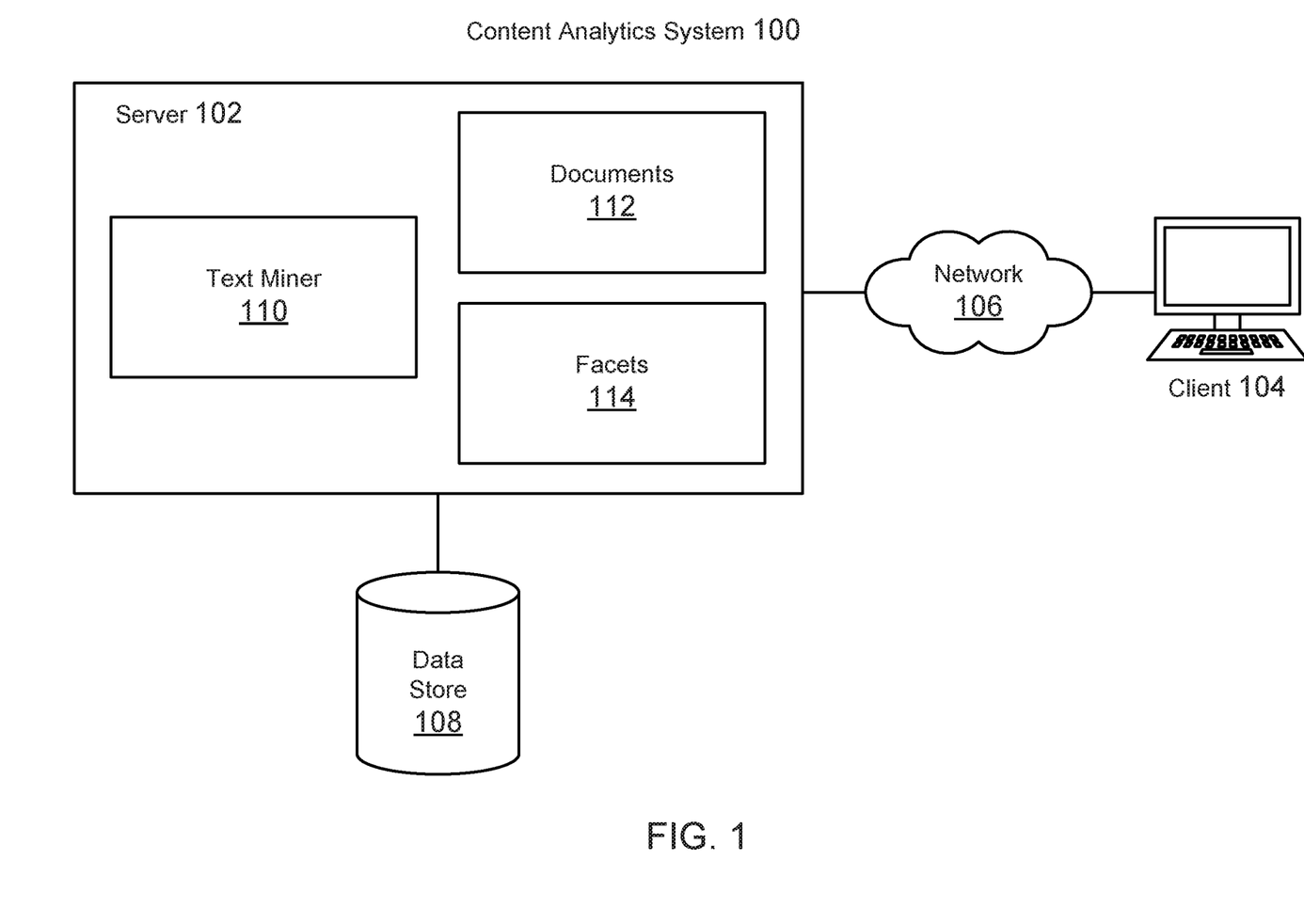
FIG. 1 illustrates an embodiment of a content analytics system according to one embodiment.

FIG. 1 illustrates an embodiment of a content analytics system 100 including one or more server computers 102 that process requests received from one or more client computers 104 over a network 106. The server 102 maintains a data store 108 comprised of textual data and other data. The server 102 executes a text miner 110 that analyzes one or more documents 112, in order to generate facets 114 for the documents 112, as described in more detail below. Specifically, the text miner 110 applies text analytics to the documents 112 to determine values for the facets 114. Text analytics are techniques that extract information and knowledge from the documents 112, e.g., content, topics, and the like, and classify that information as facet 114 values.

A facet 114 value may comprise a specific type of information to be determined from one or more of the documents 112. For example, the facet 114 value may comprise a topic of the document 112, which is determined by text mining the document 112 for its contents.

Figure 2:
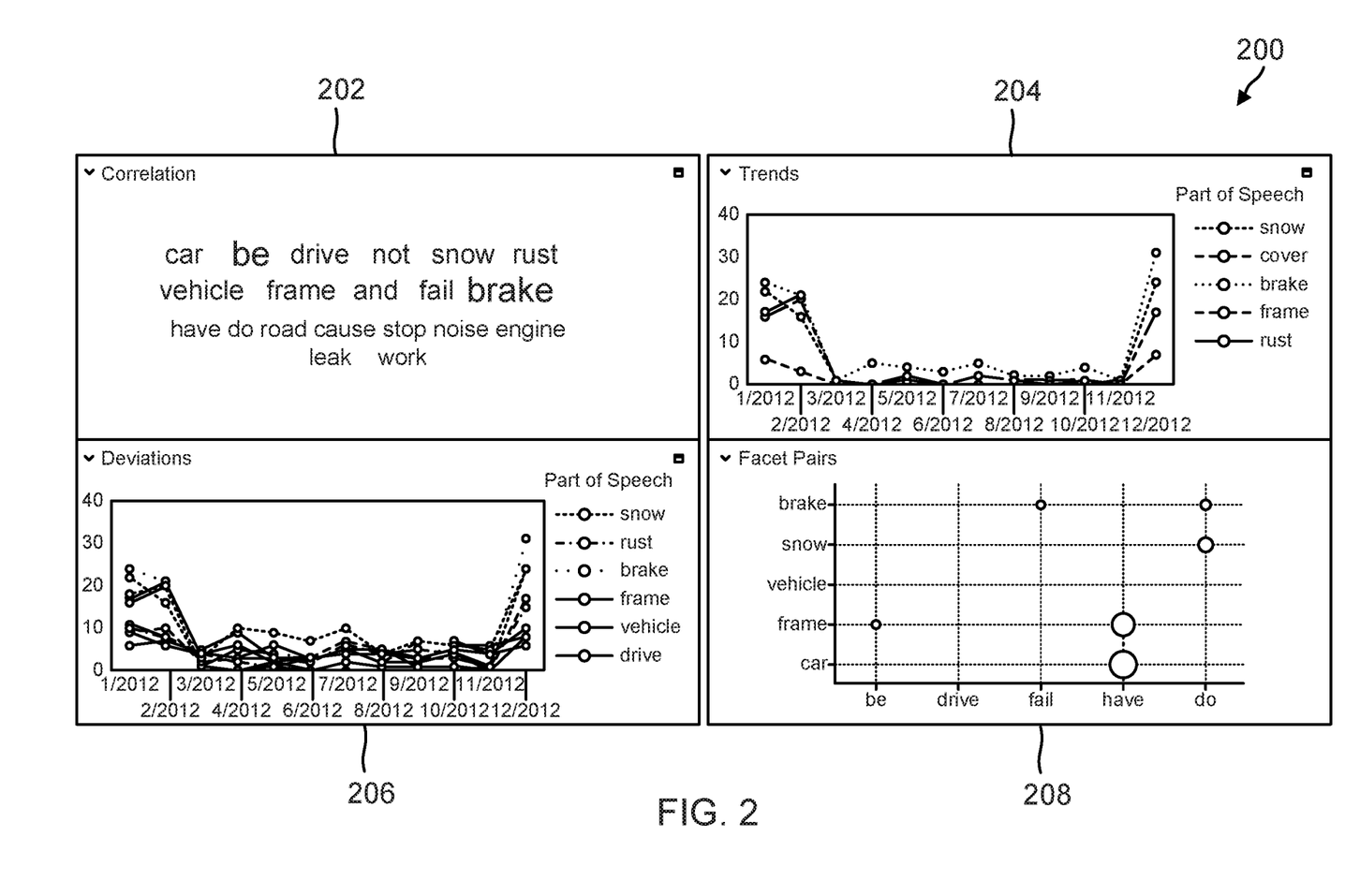
FIG. 2 illustrates a user interface showing results from calculating statistics for facets.

By calculating statistics for the facets 114, an overview for the documents 112 can be generated, as shown in FIG. 2. Specifically, FIG. 2 illustrates a user interface 200 displayed on the client 104, for example, having four quadrants 202-208, wherein showing facet 114 correlations 202; trends 204; deviations 206; and the relationships between facet pairs 208, for one or more of the documents 112. Specifically, a first quadrant 202 displays a word cloud where the size of the facets 114 indicates the correlation with one or more of the documents 112 (e.g., the larger the facet 114, the greater the correlation with the documents 112); a second quadrant 204 displays a graph of trends showing the trend of each facet's 114 occurrences in one or more of the documents 112 by date; a third quadrant 206 displays a graph of deviations showing the time bias of each facet's 114 occurrence in one or more of the documents 112 by date; and a fourth quadrant displays a graph of facet pairs showing the relationships between facets 114 in one or more of the documents 112 (the larger the circle, the more the facets 114 appear together in the documents 112). Although quadrants 204 and 206 appear to be similar, the calculations are slightly different, in that the graph of trends in the second quadrant 204 uses the delta (i.e., difference) for the previous few months to calculate the trend, and the graph of deviations in the third quadrant 206 uses an absolute count of the facets 114 for the specific time period to calculate the bias.

Figure 3:
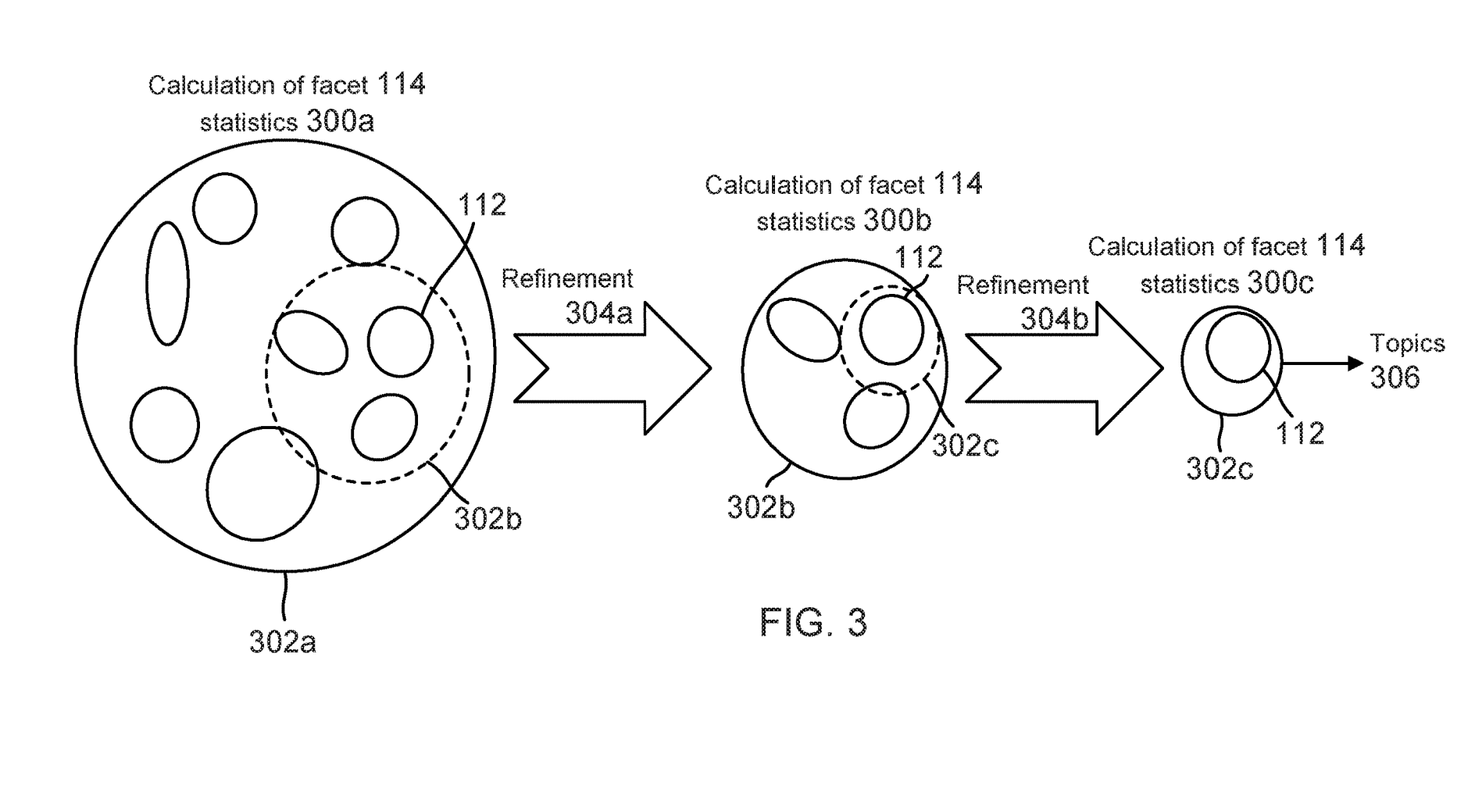
FIG. 3 illustrates a text miner iteratively calculating facet statistics for a set of documents and refining the set of documents based on the facet statistics.

FIG. 3 illustrates the text miner 110 iteratively calculating facet 114 statistics and refining a set of documents 112 based on the facet 114 statistics, in order to determine the facets associated with the documents 112, such as concepts, topics or other facts mentioned by the documents 112.

In this example, the text miner 110 performs the calculations 300a of facet 114 statistics for a set 302a of documents 112. Based on these calculations 300a, another set 302b of one or more of the documents 112, i.e., a subset 302b of the set 302a, is selected for an initial refinement 304a.

In this initial refinement 304a, the text miner 110 again performs the calculations 300b of facet 114 statistics for the subset 302b of documents 112. Based on these calculations 300b, another set 302c of one or more of the documents 112, i.e., a subset 302c of the subset 302b, is selected for an iterative refinement 304b.

In this iterative refinement 304b, the text miner 110 again performs the calculations 300c of facet 114 statistics for the subset 302c of selected documents 112. Based on these calculations 300c, certain information and knowledge, in this example, a facet 114 comprising one or more topics 306, is obtained for the subset 302c of selected documents 112. Further iterative refinements 304 and calculations 300 may be performed as necessary to identify facets 114 associated with the documents 112.

The calculation 300 of facet 114 statistics may include calculating each facet's 114 frequency, correlation, time series, etc., to find at least one facet 114 suitable for refinement 304 in order to obtain information and knowledge from the set 302 of documents 112. Refinement 304 of the set 302 of documents 112 includes extracting a subset 302 of the documents 112 that contains one or more of the facets 114, based on the calculation 300 of facet 114 statistics.

For example, repeating the calculation 300 of facet 114 statistics and repeating the refinement 304 of the set 302 of documents 112 are key operations to extract a set 302 of the documents 112 associated with one or more of the facets 114, such as a set 302 of the documents 112 that mentions a topic 306.

Figure 4:
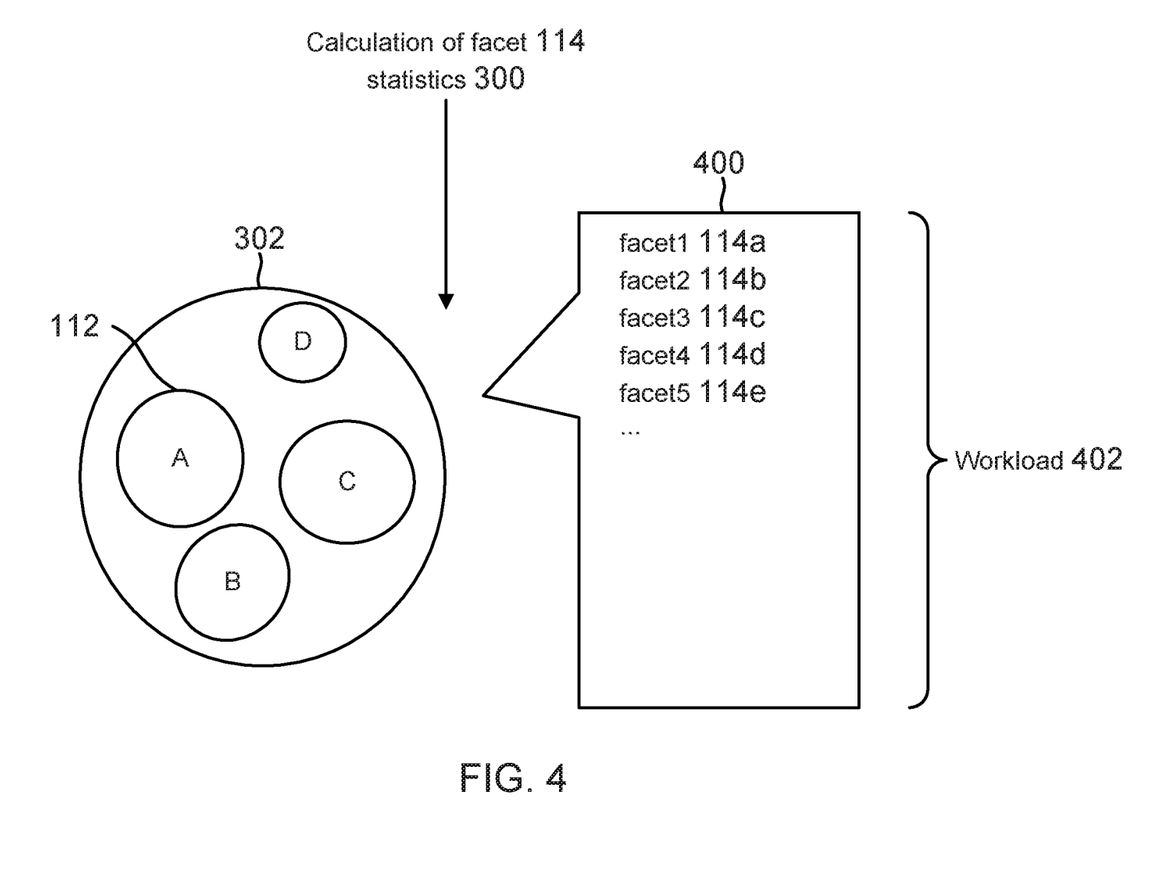
FIG. 4 illustrates a text miner performing calculations of facet statistics for a set of documents, which includes calculating each facet's frequency.

FIG. 4 illustrates the text miner 110 performing the calculations 300 of facet 114 statistics for the set 302 of documents 112, which includes calculating each facet's 114 frequency. Based on these calculations 300, a list 400 of high frequency facets 114 (i.e., facet1 114a, facet2 114b, facet3 114c, facet4 114d, facet5 114e, . . . ) is generated.

Assume that the user wants to discover highly correlative facet 114 values from the list 400. If the number of high frequency facets 114 in the list 400 is large, the workload 402 of manually correlating the high frequency facets 114 may be too great.

The workload 402 would typically involve a process of trial-and-error, which is characterized by repeated varied attempts that are continued until success or the process is stopped. Consequently, if knowledge cannot be obtained from a current set 302 of documents 112, the text miner 110 may return to a previous set 302 of documents 112 before refinement 304 and try the refinement 304 with another facet 114. The goal would be to reduce the number of attempts in the process of trial-and-error.

Figure 5:
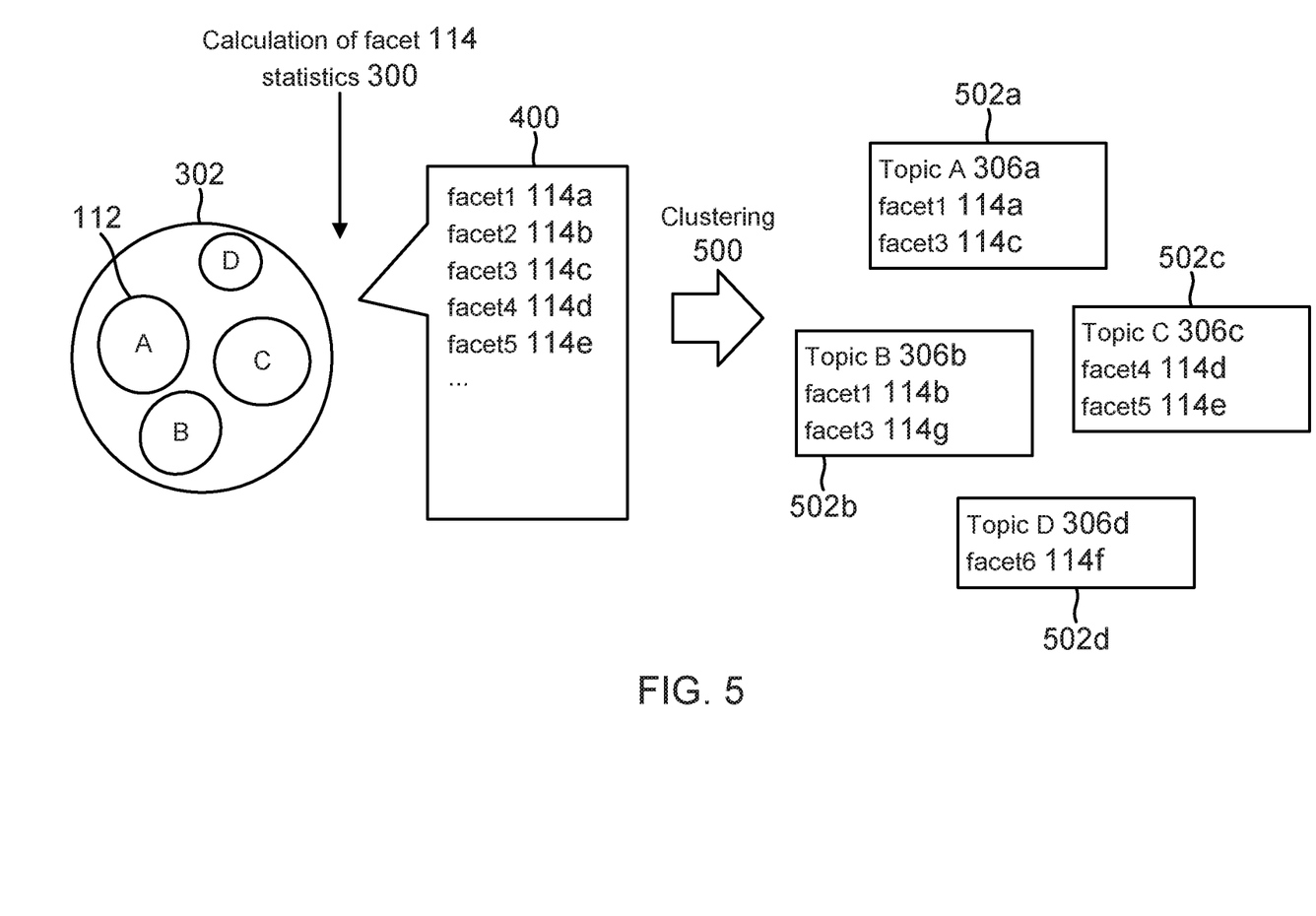
FIG. 5 illustrates one approach to reducing a workload using a text miner.

FIG. 5 illustrates one approach to reducing the workload 402 using the text miner 110. In this example, the text miner 110 performs clustering 500 on the high frequency facets 114 in the list 400, wherein the facets 114 are grouped into clusters 502 based on topics 306.

Specifically, facets 114 that belong to the same topic 306 are grouped into one cluster 502, wherein facet1 114a and facet3 114c are grouped into a cluster 502a associated with Topic A 306a; facet2 114b and facet7 114g are grouped into a cluster 502b associated with Topic B 306b; facet4 114d and facet5 114e are grouped into a cluster 502c associated with Topic C 306c; and facet6 114f is grouped into a cluster 502d associated with Topic D 306d. By clustering 500 the facets 114 appropriately based on topics 306, the amount of time involved in the process of trial-and-error is reduced.

Figure 6:
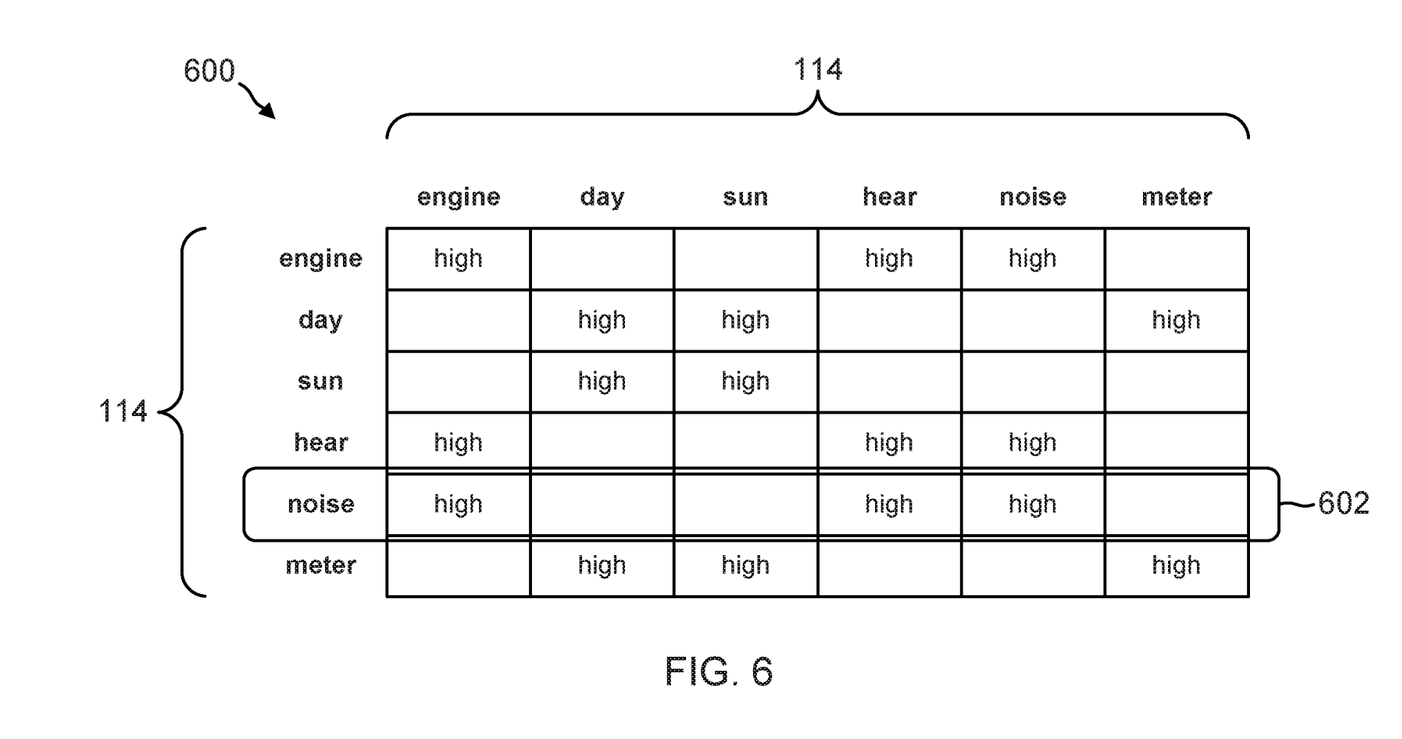
FIG. 6 illustrates how a text miner uses a correlation matrix to perform clustering.

FIG. 6 illustrates how the text miner 110 uses the clustering 500 to generate a correlation matrix 600. The correlation matrix 600 is an n-dimensional facet cube with n=2, where each facet 114 is a separate dimension and the intersection of two dimensions can be computed and displayed. In this example, the correlation matrix 600 is a self-correlation matrix 600 that includes intersections with the same facet 114 values.

In the correlation matrix 600, the same facet 114 values ("engine", "day", "sun", "hear", "noise", "meter") are placed as labels on both the rows and columns of the matrix 600. Each cell at the intersection of a specified row and column has a correlation value (or absolute frequency) for the facet 114 values represented by the specified column and row.

Moreover, a correlation vector 602 may be generated for a row and/or column of the correlation matrix 600. In this example, the correlation vector 602 is generated for the row representing the facet 114 value "noise," wherein the correlation vector 602 is comprised of a "high" correlation value for the cell at the intersection of the "noise" row and "engine" column, a "high" correlation value for the cell at the intersection of the "noise" row and "hear" column, a "high" correlation value for the cell at the intersection of the "noise" row and "noise" column, and null (blank) correlation values in the remaining cells at the intersections of the "noise" row and "day" column, of the "noise" row and "sun" column, and of the "noise" row and "meter" column. Thus, the facet 114 value of "noise" is highly correlated with the facet 114 values of "engine" and "hear," but is not highly correlated with the facet 114 values of "day", "sun", and "meter".

Figure 7:
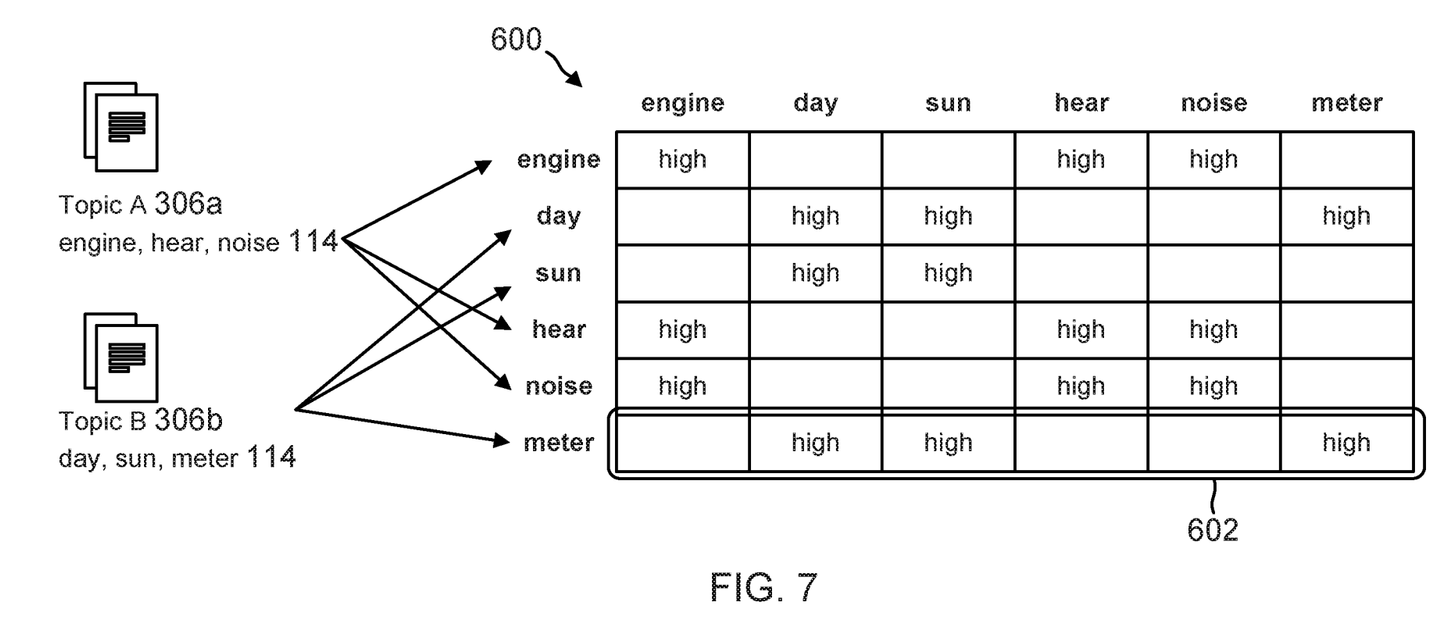
FIG. 7 illustrates how clustering of facets is performed by a text miner on rows and/or columns of a correlation matrix.

FIG. 7 illustrates how the clustering 500 of the facets 114 is performed by the text miner 110 on the rows or columns of the correlation matrix 600 using the facets 114 comprising topics 306.

In this example, the documents 112 are from a corpus related to automobiles. Topic A 306a includes the highly correlated facet 114 values of "engine", "hear" and "noise", e.g., noise is heard from the engine, while Topic B 306b includes the highly correlated facet 114 values of "day", "sun" and "meter", e.g., it is difficult to check the speed meter on a sunny day.

Specifically, clustering 500 is based on the correlation vector 602, where the highly correlated facet 114 values in the correlation vector 602 belonging to same topic 306 are grouped or aggregated together in a cluster 502. The text miner 110 also calculates a distance correlation, i.e., the statistical dependence, of the facet 114 values in each of the clusters 502, as well as a center of each of the clusters 502 based on the distance correlation that is used to identify facet 114 values near the center of the cluster 502.

Figure 8:
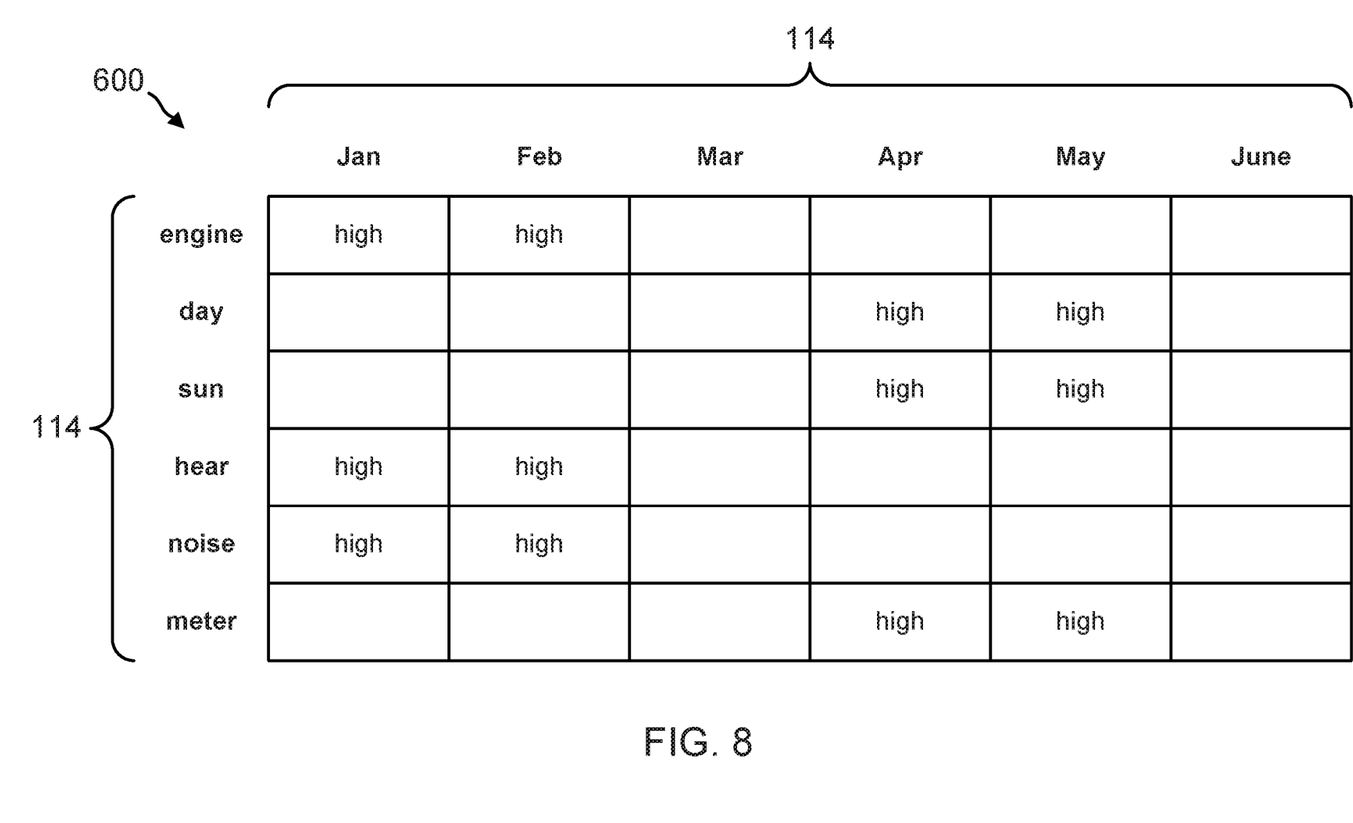
FIG. 8 illustrates the benefits derived from using a correlation matrix to perform real-time dynamic clustering of facets.

FIG. 8 illustrates the benefits derived from using the correlation matrix 600 to perform real-time dynamic clustering 500. Specifically, using the correlation matrix 600, clustering 500 can be performed by the text miner 110 dynamically. Moreover, the content analytics system 100 provides index structures for calculating n-dimensional cube structures, even for large-scale distributed systems, which can be applied to perform the clustering 500 in real-time using the correlation matrix 600.

For example, in FIG. 8, the column facet 114 values of the correlation matrix 600 have been dynamically changed to perform a time series analysis of the row facet 114 values. Specifically, the facet 114 values for the columns of the correlation matrix 600 have been changed to "Jan" (January), "Feb" (February), "Mar" (March), "Apr" (April), "May" (May), and "June" (June). From the correlation matrix 600, it can be seen that Topic A 306a, which includes the facet 114 values of "engine", "hear" and "noise", are highly correlated with clusters 502 in January and February, while Topic B 306b, which includes the facet 114 values of "day", "sun" and "meter", are highly correlated with clusters 502 in April and May.

The end result is real-time dynamic clustering 500 performed by the text miner 110. Using the real-time dynamic clustering 500, an end user can dynamically change the analysis of facet 114 values in real-time.

Flowchart

Figure 9:
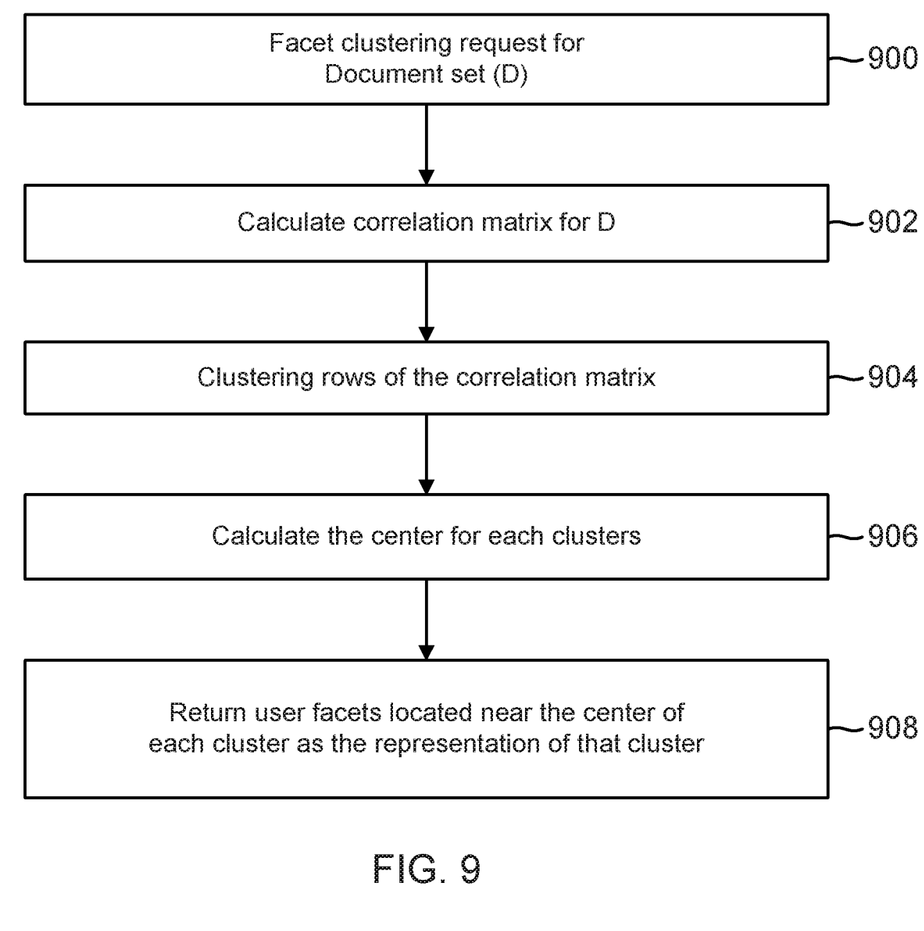
FIG. 9 is a flowchart illustrating the steps performed by a text miner, according to one embodiment.

FIG. 9 is a flowchart illustrating text mining 110 based on facets 114 to analyze unstructured data in one or more documents 112, according to one embodiment.

Block 900 represents the text miner 110 receiving a facet clustering request for a set (D) 302 of one or more of the documents 112.

Block 902 represents the text miner 110 generating a two-dimensional facet cube that is a correlation matrix 600 for one or more facets associated with the set (D) 302.

Block 904 represents the text miner 110 clustering 500 one or more rows of the correlation matrix 600, which includes grouping one or more of the facets 114 in a correlation vector 602 in the correlation matrix 600 into at least one cluster 502.

Block 906 represents the text miner 110 calculating a center for each of the clusters 502.

Block 908 represents the text miner 110 responding to the received request by identifying the facets 114 that are located near the calculated center of each of the clusters 502 as being representative of that cluster 502.

Empirical Results

Figure 10:
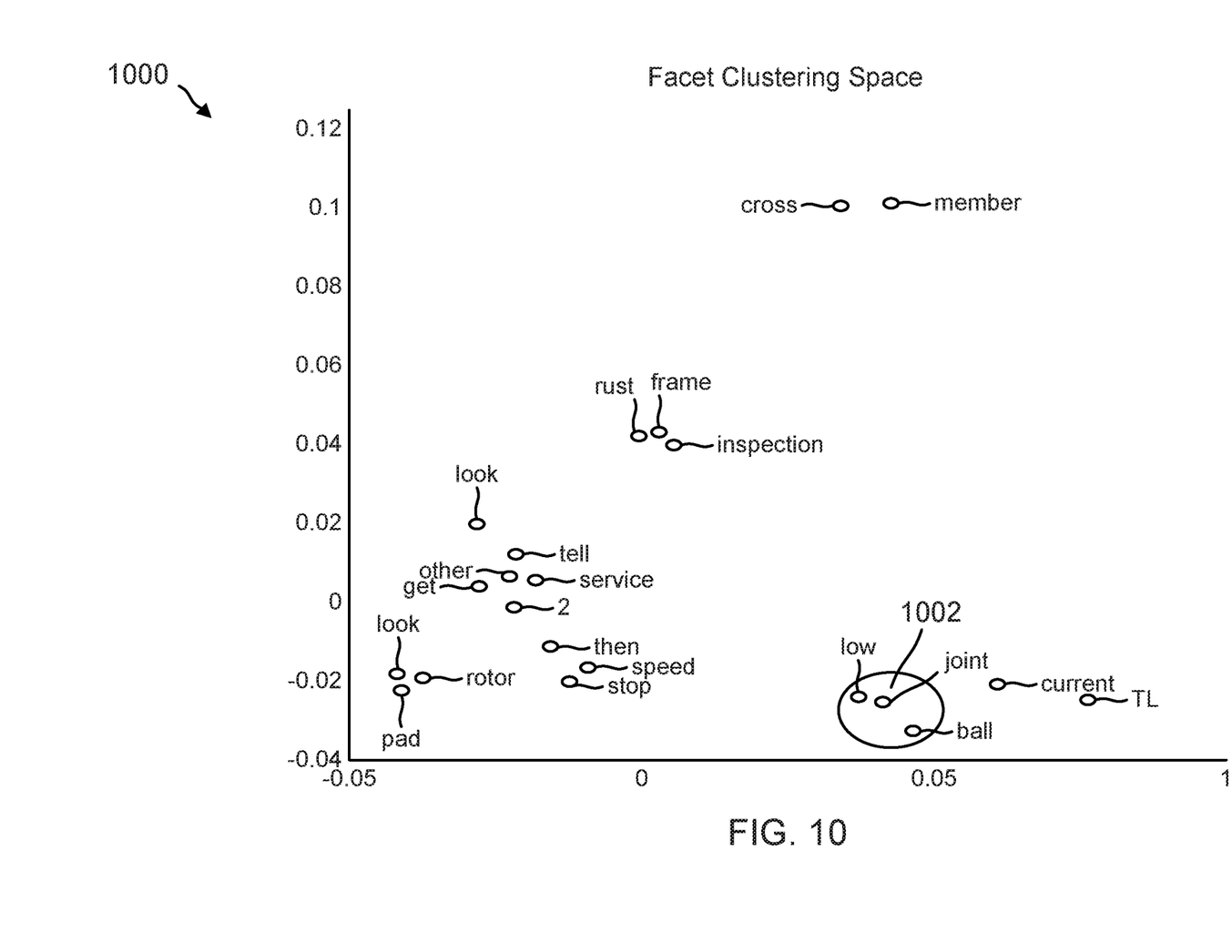
FIG. 10 illustrates a user interface showing empirical results from applying real-time dynamic clustering of facets to a corpus of documents.

FIG. 10 illustrates a user interface 1000 displayed on the client 104, for example, showing empirical results from applying the invention to a corpus of documents 112 comprising car problem reports. In this example, the user interface 1000 includes a graph of two-dimensional correlation vectors for each facet 114, which are chosen and plotted on a correlation vector space, wherein the x and y axes are correlation vector dimensions reduced or compressed by principal component analysis (PCA).

For example, 1002 represents the correlation of the facet 114 values of "low", "ball" and "joint", indicating that there are many documents 112 reporting problems on low(er) ball joints, which may form the basis for a recall.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    text mining based on facets to analyze unstructured data in one or more documents by:
        generating a two-dimensional facet cube that is a correlation matrix for one or more facets associated with a set of one or more of the documents;
        grouping one or more of the facets in the correlation matrix into at least one cluster;
        calculating a center for the cluster;
        identifying facets that are located near the calculated center of the cluster as being representative of the cluster; and iteratively calculating facet statistics and refining the set based on the facet statistics, in order to determine the facets associated with the documents in the set.

2. The method of claim 1, wherein the correlation matrix comprises a self-correlation matrix.

3. The method of claim 1, wherein an intersection of a specified row and column of the correlation matrix has a correlation value for the facets represented by the specified row and column.

4. The method of claim 3, wherein grouping one or more of the facets further comprises:
generating a correlation vector for a row or column of the correlation matrix; and
grouping the facets in the correlation vector into the cluster.

5. The method of claim 4, further comprising calculating a distance correlation for the facets in the cluster.

6. The method of claim 5, further comprising calculating a center of the cluster to identify at least one of the facets in the cluster that is nearest the center of the cluster based on the distance correlation.

7. A computer-implemented system, comprising:
one or more computers, comprising one or more processors and one or more tangible storage media for storing programming instructions, programmed for text mining based on facets to analyze unstructured data in one or more documents by:
generating a two-dimensional facet cube that is a correlation matrix for one or more facets associated with a set of one or more of the documents;
grouping one or more of the facets in the correlation matrix into at least one cluster;
calculating a center for the cluster;
identifying facets that are located near the calculated center of the cluster as being representative of the cluster; and
iteratively calculating facet statistics and refining the set based on the facet statistics, in order to determine the facets associated with the documents in the set.

8. The system of claim 7, wherein the correlation matrix comprises a self-correlation matrix.

9. The system of claim 7, wherein an intersection of a specified row and column of the correlation matrix has a correlation value for the facets represented by the specified row and column.

10. The system of claim 9, wherein grouping one or more of the facets further comprises:
generating a correlation vector for a row or column of the correlation matrix; and
grouping the facets in the correlation vector into the cluster.

11. The system of claim 10, further comprising calculating a distance correlation for the facets in the cluster.

12. The system of claim 11, further comprising calculating a center of the cluster to identify at least one of the facets in the cluster that is nearest the center of the cluster based on the distance correlation.

13. A computer program product, the computer program product comprising a computer readable storage medium having program instructions embodied therewith, the program instructions executable by one or more computers to cause the computers to perform a method comprising:
text mining based on facets to analyze unstructured data in one or more documents by:
generating a two-dimensional facet cube that is a correlation matrix for one or more facets associated with a set of one or more of the documents;
grouping one or more of the facets in the correlation matrix into at least one cluster;
calculating a center for the cluster;
identifying facets that are located near the calculated center of the cluster as being representative of the cluster; and
iteratively calculating facet statistics and refining the set based on the facet statistics, in order to determine the facets associated with the documents in the set.

14. The computer program product of claim 13, wherein the correlation matrix comprises a self-correlation matrix.

15. The computer program product of claim 13, wherein an intersection of a specified row and column of the correlation matrix has a correlation value for the facets represented by the specified row and column.

16. The computer program product of claim 13, wherein grouping one or more of the facets further comprises:
generating a correlation vector for a row or column of the correlation matrix; and
grouping the facets in the correlation vector into the cluster.

17. The computer program product of claim 16, further comprising calculating a distance correlation for the facets in the cluster.

18. The computer program product of claim 17, further comprising calculating a center of the cluster to identify at least one of the facets in the cluster that is nearest the center of the cluster based on the distance correlation.

* * * * *